May 28, 1968 R. M. FOLDENAUER 3,385,203
MEAT MOLD
Filed April 19, 1967
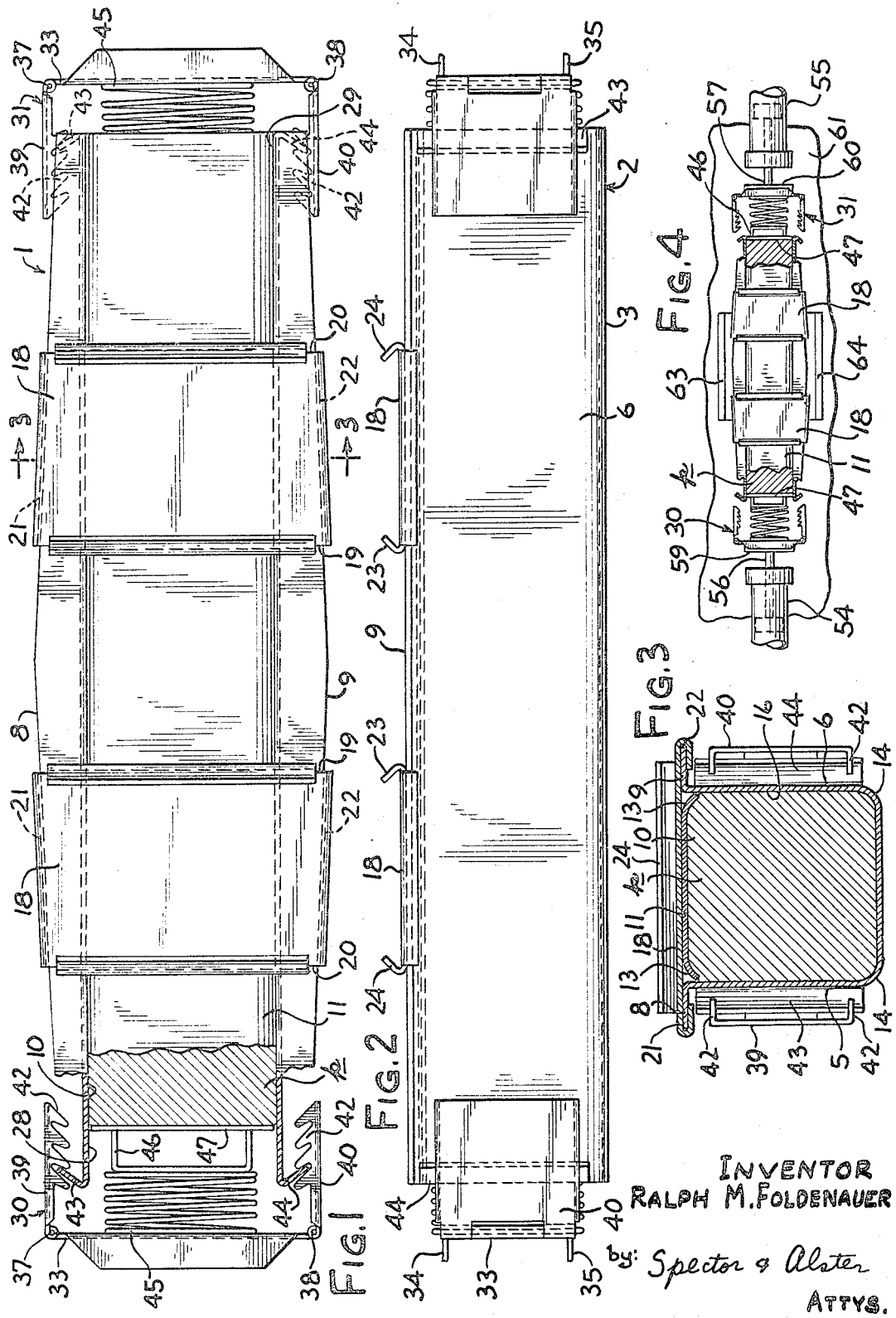
INVENTOR
RALPH M. FOLDENAUER
by: Spector & Alster
ATTYS.

United States Patent Office 3,385,203
Patented May 28, 1968

3,385,203
MEAT MOLD
Ralph M. Foldenauer, Chicago, Ill., assignor to Bloomer-Fiske, Inc., a corporation of Illinois
Continuation-in-part of application Ser. No. 580,006, Sept. 16, 1966. This application Apr. 19, 1967, Ser. No. 632,013
8 Claims. (Cl. 99—351)

ABSTRACT OF THE DISCLOSURE

A mold for cooking loaves of meat comprises an elongated body having a side opening for filling the mold, and spring pressed covers for the ends of the body. A closure for the side opening is held by clamps which are wedged onto the body and bear against the closure. A press is employed to mount the end covers onto the mold body and place the meat under pressure.

This application is a continuation-in-part of my pending application Ser. No. 580,006, filed Sept. 16, 1966.

This invention relates to equipment for cooking loaves of meat, and more particularly, to a mold that forms part of such equipment.

In my aforesaid pending application there is disclosed a loaf mold having spring biased end lids that hold the product under continuous compression during cooking and chilling thereof. The mold has a longitudinal side opening through which it may be filled and a removable closure for the side opening. In filling the mold, both of the end lids are positioned partially in place, the mold is filled through the side opening, whereupon the removable closure for the side opening is secured in place. By means of a press, pressure may then be applied to both end lids to lock them in place and put the loaf in the mold under sufficient compression so that during cooking and chilling the loaf is constantly maintained under pressure.

It is an object of this invention to provide a mold of the general type stated having an improved clamping structure for securing the removable side-opening closure member in place. In a preferred form of the invention the clamping structure comprises two clamps which are slid onto the mold body from opposite ends thereof and bear against substantial portions of the outside surface of the closure member. This prevents bulging of the closure member when the product is placed under compression in the press that secures the end lids in place and thus insures that the product within the mold will be of uniform cross section when it is cooked. The clamps are held in place by a wedging engagement with side flanges on the mold body.

The attainment of the above and the object of this invention will be apparent from the following description taken in conjunction with the accompanying drawing forming a part thereof.

In the drawing:

FIG. 1 is a top plan view, partially broken away and in section, and showing a loaf mold constructed in accordance with and embodying the present invention;

FIG. 2 is a side-elevational view thereof;

FIG. 3 is a sectional view taken along line 3—3 of FIG. 1; and

FIG. 4 is a top plan view of apparatus for pressing the spring-loaded end closures onto the mold body after the mold has been filled.

Referring now in more detail and by reference characters to the drawing, which illustrates a preferred embodiment of this invention, 1 designates a mold comprising an elongated hollow body 2 having a bottom wall 3 and spaced, parallel longitudinally extending side walls 5, 6. At their upper ends, the side walls 5, 6 have laterally extending side flanges 8, 9. As best seen in FIG. 1, these side flanges 8, 9 each taper from the mid-point of the mold body 2 toward each of the opposite ends of the body 2.

The upper end portion of the mold body 2 is open throughout the full length thereof to provide a longitudinal opening 10 through which the mold body 2 may be filled. A removable sheet metal closure plate 11 of substantially the same length as the body is adapted to close the opening 10. The closure plate 11 does not form a hermetic seal due to small clearance between the lateral edges of the plate 11 and the side walls 5, 6. As best seen in FIG. 3, the central part of the closure plate 11 is parallel to the bottom wall 3 when the closure plate 11 is in closed position. At its sides, the closure plate 11 has inwardly turned radii 13, 13 which are similar to the radii 14, 14 that join the bottom wall 3 with the side walls 5, 6. These radii avoid sharp corners along the length of the mold and enable the product within the mold readily to assume the cross sectional shape of the mold cavity 16 when the product therein is placed under compression, as will hereinafter be explained. In the present form of the invention, the mold cavity 16 is approximately square in cross section although a mold cavity of rectangular or other cross section may be used.

When the mold is filled with the product p, the closure plate 11 is retained in position by suitable sheet metal clamps 18, 18. Each clamp 18 is tapered from one end 19 to the other end 20, the taper being approximately the same as that of the flanges 8, 9. As best seen in FIG. 3, the tapered sides of each clamp 18, 18 are reversely bent to underlie the flanges 8, 9 and thus form slots 21, 22 that receive the flanges 8, 9. The portion of each clamp 18, 18 that spans the space between the flanges 8, 9 is flat and bears facewise against the flat or central portion of the closure plate 11 between the radii 13, 13. Accordingly, there is a substantial area of pressure engagement between each clamp 18, 18 and the closure plate 11 which thereby holds the closure plate 11 substantially flush with the flanges 8, 9 and resists the tendency of the closure plate 11 to bulge. This assures that the cross section of the molded product p will remain uniform so that when the cooked product is cut by a slicing machine, each slice of a given thickness will be of uniform weight.

The mold body 2 also has open opposite ends 28, 29 that are adapted to be closed by identical end closures 30, 31. Each end closure comprises a rectangular base or spring backing 33 having opposed outwardly extending flanges 34, 35. Secured to the transverse ends of the backing 33 by hinges 37, 38 are arms 39, 40, the lateral margins of which are inwardly turned and shaped to provide uniform groups of ratchet teeth 42, two groups being on each arm 39, 40. The corresponding ratchet teeth 42 in each group are adapted to engage outwardly and reversely turned flanges 43, 44 at each of the ends of the side walls 5, 6 to hold the end closures 30, 31 onto the mold body 2.

Welded or otherwise rigidly secured at one end to each backing 33 is a coil compression spring 45, the longitudinal axis of which is preferably coaxial with the mold cavity 16 that is formed when the closure plate 11 and end closures are mounted on the body 2. The other end of each spring 45 is welded to the bight of a channel 46 which is, in turn, welded to a pressure plate 47 which is axially slidable in the mold cavity 16 and has a configuration, in plan vew, that is substantially the same as the cross section of the mold cavity 16 with the closure member 11 in place. The springs maintain the respective pressure plates 47 in pressure engagement with the ends of the loaf $p$ so that the ends of the loaf are always at right angles to the longitudinal axis of the loaf. Likewise, the forces from the compressed springs maintain the ratchet teeth 42 in engagement with the flanges 43, 44.

Prior to filling the mold 1, the mold body 2 is placed on a suitable support 61 and the end covers 30, 31 secured in place by a suitable press, for instance that shown in FIG. 4. The mold body 2 may be positioned between two angle bars 63, 64 on the support 61. The cover 11 is removed so that the longitudinal opening 10 is upwardly presented. The end closures 30, 31 are positioned as shown in FIG. 4, namely so that the pressure plates 47, 47 are just inside the open ends of the body 2 but none of the ratchet teeth 42 are engaged with the flanges 43, 44. In these positions of the end closures the springs 45, 45 are not compressed.

Adjacent to each end of the mold body 2 are pneumatic cylinders 54, 55 having piston rods 56, 57 that terminate in plates 59, 60 which are adapted to bear against the backings 33 between the flanges 34, 35, and thereby temporarily hold the pressure plates 47, 47 inside of the open ends of the mold body 2. These cylinders 54, 55 are rigidly mounted on the support 61 so that the piston rods 56, 57 will be substantially coaxial with the mold cavity 16. In this regard is should be noted that the support 61 may be any suitable work platform, such as a portable frame, or a table which may have caster-supported legs so that the table may be moved about, as desired. These pieces may be placed in the mold so that the grain of the meat is oriented longitudinally of the mold.

The mold is filled through the open top with the products 52. By way of example, but not of limitation, the product may be pieces of ham or other meat. Also suitable control valves may be mounted on the support 61 or otherwise provided to supply air selectively to either end of each cylinder 54, 55 and thereby move either piston rod 56, 57 in both directions, or to move the piston rods in unison in opposite directions. When the mold has been filled, each clamp 18 is slid onto the mold body 2 from one end thereof by engagement of the flanges 8, 9 with the slots 21, 22. The clamps, 18, 18 are advanced toward the mid-point of the body until flanges 8, 9 are in wedging engagement with the base portions of the slots 21, 22. Each clamp has an upturned inclined projection 23 at the end 19 for receiving a screwdriver or like tool that may be struck with a hammer or mallet and thereby force the clamp 18 into a snug, wedging engagement with the flanges 8, 9. A like projection 24 at the other end 20 of each clamp 18 may be utilized to loosen the clamp 18 from the flanges 8, 9.

Thereafter, pressured air is introduced into the cylinders 54, 55 to move the piston rods 56, 57 toward each other. The piston rods apply pressure through their plates 59, 60 which is transmitted through the springs 45, 45 to the pressure plates 47, 47. This moves the pressure plates 47, 47 toward each other so that the meat product 52 may be placed under a desired amount of compression and caused to fill the mold cavity 16 completely. The grain of the meat is relatively undisturbed by the compression. The resistance of the product 52 causes compression of the springs 45, 45 resulting in movement of the arms 39, 40 toward the flanges 43, 44. The arms 39, 40 may be swung about their respective hinges to bring the ratchet teeth 42 into engagement with the flanges 43, 44, as shown in FIG. 1. The piston rods 56, 57 may then be retracted from the end closures 30, 31, leaving the springs 45, 45 held compressed by the engagement of the ratchet teeth 42 with the flanges 43, 44.

In the preferred form of the invention, each clamp 18 is of a length between its ends 19, 20 that is about one-fifth of the length of the closure member 11 and mold body 2. It has been found that this provides a sufficiently large area of contact of the clamps 18, 18 with the top surface of the closure member to prevent the latter from bulging when under pressure from the product in the mold cavity without the necessity of having to use an unduly heavy gauge of metal in the closure member 11. Also, it has been found that it is preferable to design the tapers on the flanges 8, 9 and on the clamps 18, 18 so that the wedge-fit between them positions the clamps at a distance apart that is roughly the same as the length of a clamp 18.

The closed mold may then be removed from the support 61 and placed in a suitable steam chamber or other heated atmosphere to cook the loaf $p$. During cooking, the loaf will undergo expansion and contraction and will ultimately end up smaller in length than the originally pressed length it had when the cooking began. However, the spring-biased pressure plates 47, 47 maintain the loaf constantly under sufficient compression to assure that the loaf always fully fills the mold cavity so that the completed loaf has a uniform cross section. Since the grain of the meat has been relatively undisturbed, when the cooked loaf is run through a slicing machine to slice it at right angles to its longitudinal axis, the slicing will be across the grain.

The precise constructions herein shown are illustrative of the principles of the invention. What is considered new and sought to be secured by Letters Patent is:

1. A loaf mold comprising an elongated hollow body for receiving a product to be molded as a loaf and wherein the product is subject to change in dimension during the mold processing operation, said body having open opposite ends and an open side through which the mold may be filled, a closure member for said open side, and means for retaining the closure member in closed position including a clamp outwardly of said closure member and having a portion bearing thereagainst, and cooperating means on said body and clamp forming a connection between the two for shifting of one relative to the other and then for wedging engagement of the two; said body also having closures for each of said opposite ends, at least one of said end closures comprising a pressure member movable in said body for engagement with the adjacent end of a product in the mold, and spring means for imposing pressure on the pressure member to maintain it in continuous pressure engagement with the product after the mold has been filled and as the product changes dimension during the mold-processing operation, said means for retaining said closure member imposing pressure over a sufficiently large area thereof to prevent substantial distortion thereof when the mold is filled and the product is under pressure therein.

2. A loaf mold according to claim 1 in which said cooperating means on the body and clamp comprise relatively sliding parts that taper toward an end of said body such that the clamp may be assembled with the body at said last-mentioned end and then by relative sliding of the clamp and body position the clamp at a location between said opposite ends where said tapering parts wedgingly engage.

3. A loaf mold according to claim 2 in which a cooperating tapered part on said body tapers from a region between said opposite ends toward each of said opposite ends.

4. A loaf mold according to claim 2 in which said cooperating tapered parts comprise flanges on the body on opposite sides of said side opening and slots at opposite edges of said clamp for receiving said flanges, the edges of said clamp and the edges of said flanges converging toward one end of the body.

5. A loaf mold according to claim 4 in which the edges of said flanges also taper from a region thereof between said opposite ends toward said other end, said closure-retaining means further includes an additional clamp similar to the first-mentioned clamp, and said portions of the clamps span the width of said closure member and maintain it parallel to the side of said body that is opposite to said side opening, the remaining sides of said body cooperating with said closure member and body side opposite thereto to form a mold cavity of substantially uniform cross section between said end closures.

6. A loaf mold according to claim 1 in which said clamp has means on the side thereof that is opposite to said cover member for receiving a tool for driving the clamp into wedging engagement with the body and for loosening the same from said wedging engagement.

7. A loaf mold according to claim 1 in which said means for retaining the closure member comprises an additional clamp bearing against said closure member and spaced from the first-mentioned clamp.

8. A loaf mold according to claim 1 in which said area is at least approximately two-fifths of the area of the outwardly presented surface of said closure member.

References Cited

UNITED STATES PATENTS

| | | | |
|---|---|---|---|
| 719,817 | 2/1903 | Kunze | 24—25 |
| 1,577,851 | 3/1926 | Peschke | 100—244 |
| 1,624,808 | 4/1927 | Scholten | 99—351 |
| 1,792,411 | 2/1931 | Butz | 99—351 |
| 1,863,609 | 6/1932 | Vanderkloot | 99—351 |
| 1,962,877 | 6/1934 | Roth et al. | 99—351 |
| 1,981,889 | 11/1934 | Wolff | 99—351 |
| 2,244,540 | 6/1941 | Lenzke | 100—219 |
| 2,665,822 | 1/1954 | Crawford | 220—55 |
| 2,696,442 | 12/1954 | Allbright | 99—351 XR |
| 2,805,788 | 9/1957 | Allbright et al. | 292—259 XR |
| 3,039,382 | 6/1962 | Simon et al. | |

FOREIGN PATENTS

| | | |
|---|---|---|
| 421,634 | 4/1926 | Germany. |

BILLY J. WILHITE, *Primary Examiner.*